United States Patent [19]

DiStacio

[11] Patent Number: 5,460,468
[45] Date of Patent: Oct. 24, 1995

[54] ONE-WAY NUT AND BOLT

[75] Inventor: Robert J. DiStacio, Valhalla, N.Y.

[73] Assignee: PermaThread Technologies, Inc., Massapequa, N.Y.

[21] Appl. No.: 302,127

[22] Filed: Sep. 7, 1994

[51] Int. Cl.⁶ .............................. F16B 39/32; F16B 31/00
[52] U.S. Cl. ................... 411/329; 411/7; 411/299
[58] Field of Search ........................ 411/7, 114, 115, 411/195, 196, 299, 322, 329, 433

[56] References Cited

U.S. PATENT DOCUMENTS

| | | |
|---|---|---|
| 307,722 | 11/1884 | Klemroth . |
| 591,062 | 10/1897 | Smith . |
| 1,088,892 | 3/1914 | Foreman . |
| 1,089,159 | 3/1914 | Santarcangelo . |
| 1,136,310 | 4/1915 | Burnett . |
| 1,221,194 | 4/1917 | Lang . |
| 1,226,143 | 5/1917 | Stubblefield . |
| 1,245,362 | 11/1917 | Lynch . |
| 1,278,028 | 9/1918 | Savory et al. ................ 411/329 |
| 1,465,148 | 8/1923 | Rosenberg . |
| 1,703,947 | 3/1929 | Nation ........................ 411/329 |
| 2,232,236 | 2/1941 | Meersteiner . |
| 2,301,181 | 11/1942 | Ilsemann . |
| 2,484,645 | 10/1949 | Baumle . |
| 2,521,257 | 9/1950 | Sample ....................... 411/329 |
| 2,834,390 | 5/1958 | Stevens . |
| 3,176,746 | 4/1965 | Walton . |
| 3,517,717 | 6/1970 | Orlomoski . |
| 3,729,757 | 5/1973 | Wright . |
| 3,982,575 | 9/1976 | Ollis, Jr. . |
| 4,024,899 | 5/1977 | Stewart . |
| 4,168,731 | 9/1979 | Taber . |
| 4,790,703 | 12/1988 | Wing ........................... 411/260 |
| 4,900,208 | 2/1990 | Kaiser ......................... 411/387 |
| 5,238,342 | 8/1993 | Stencel .................... 411/329 X |

Primary Examiner—Neill R. Wilson
Attorney, Agent, or Firm—Robert C. Kain, Jr.

[57] ABSTRACT

The bolt, in the one-way nut and bolt combination, includes a head, a stem, and bolt thread on said stem. A longitudinal channel is defined on the stem by a plurality of aligned notches extending through the crests of the threads. Each notch is defined by a radially aligned surface and an angularly displaced surface. The nut has a threaded bore that is complimentary to the bolt thread and includes at least one longitudinal cut-out. The nut further includes a compressible tine extending into the cut-out. The compressible tine has a body portion and a substantially radially aligned distal end portion. The distal end portion of the tine and the cut-out defines a narrow mouth leading to a wider throat deeper in the cut-out. The nut thread and the bolt thread cooperatively permit a user to translate the nut along the bolt threads by means of one-way rotation. The tine is alternately flexed inboard into the cut-out, by the bolt threads, and then released when the tine is disposed in the longitudinal channel. The longitudinal channel and respective notches forming the channel prevent counter-rotational movement of the nut on the bolt when the distal end of the tines abuts the radially aligned surface of the notches.

15 Claims, 4 Drawing Sheets

ONE-WAY NUT AND BOLT

The present invention relates to a self-locking nut and bolt assembly and, more particularly, to a self-locking nut and bolt assembly in which the nut can be easily threaded onto the bolt in one direction, but which cannot be counter-rotated.

BACKGROUND OF THE INVENTION

U.S. Pat. No. 307,722 to Klemroth discloses a nut lock wherein the nut includes a projection or prong at its end. The bolt includes a longitudinal groove through the crest of the bolt threads. When the nut has been screwed onto the bolt, to a desired position, and the prong is aligned with the groove, the remote end of the prong can be punched or driven into the groove thereby firmly locking the nut on the bolt.

U.S. Pat. No. 2,484,645 to Baumle discloses a screw fastener having longitudinal ridges that partially block the inner spaces defined by the root of the bolt threads. These longitudinal ridges coact with the longitudinal ridges found in female thread rolled dies.

U.S. Pat. No. 2,232,336 to Meersteiner discloses a fastening screw having longitudinal channels extending through the bolt thread crest and roots.

U.S. Pat. No. 4,024,899 to Stewart discloses resilient tines formed on the apex or peak portions of the threads on both the nut and bolt. These resilient tines coact with slightly dished or concave recesses in corresponding tines.

U.S. Pat. No. 591,062 to Smith discloses a bolt having a raised, threaded portion with a spur or lug. The spur or lug has a shoulder at one side and a beveled face at the other which locks a nut against counter-rotation.

U.S. Pat. No. 4,168,731 to Tabor discloses a nut having an internally threaded cylindrical inner wall portion joined at one end by a connecting portion to an outer wall portion. The inner and outer walls are separated by an annular volume.

OBJECTS OF THE INVENTION

It is an object of the present invention to provide a one-way nut and bolt combination.

It is another object of the present invention to provide a one-way nut and bolt combination which locks the nut and bolt at predefined positions, thereby eliminating the possibility that vibration may loosen the nut and bolt.

It is a further object of the present invention to provide a nut that can readily be removed, by a user, from the bolt.

It is yet another object of the present invention to provide a one-way nut and bolt combination that does not require the use of any special tools to correctly install the nut on the bolt.

It is a further object of the present invention to provide a one-way nut and bolt combination which automatically locks into place upon counter-rotational movement of the nut without additional actions or mechanical adjustments to secure the lock between the nut and the bolt.

It is still another object of the present invention to provide a one-way nut and bolt combination in which, if the nut is put on the bolt backwards, the nut will not lock and the nut and bolt combination can be used as an ordinary nut and bolt combination.

SUMMARY OF THE INVENTION

The bolt, in the one-way nut and bolt combination, includes a head, a stem, and bolt thread on said stem. A longitudinal channel is defined on the stem by a plurality of aligned notches extending through the crests of the threads. Each notch is defined by a radially aligned surface and an angularly displaced surface. The nut has a threaded bore that is complimentary to the bolt thread and includes at least one longitudinal cut-out. The nut further includes a compressible tine extending into the cut-out. The compressible tine has a body portion and a substantially radially aligned distal end portion. The distal end portion of the tine and the cut-out defines a narrow mouth leading to a wider throat deeper in the cut-out. The nut thread and the bolt thread cooperatively permit a user to translate the nut along the bolt threads by means of one-way rotation. The tine is alternately flexed inboard into the cut-out, by the bolt threads, and then released when the tine is disposed in the longitudinal channel. The longitudinal channel and respective notches forming the channel prevent counter-rotational movement of the nut on the bolt when the distal end of the tines abuts the radially aligned surface of the notches.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENT

The present invention relates to a nut and bolt combination that allows one-way rotational movement.

Figure 1:
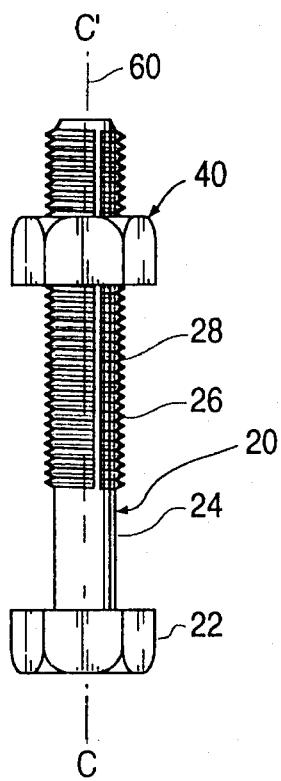
FIG. 1 illustrates a side view of the one-way nut and bolt of the present invention.

FIG. 1 illustrates one-way nut and bolt 10 including bolt 20 and nut 40. Bolt 20 includes head 22, stem 24, and bolt 26. FIG. 1 also shows channel 28.

Figure 2:
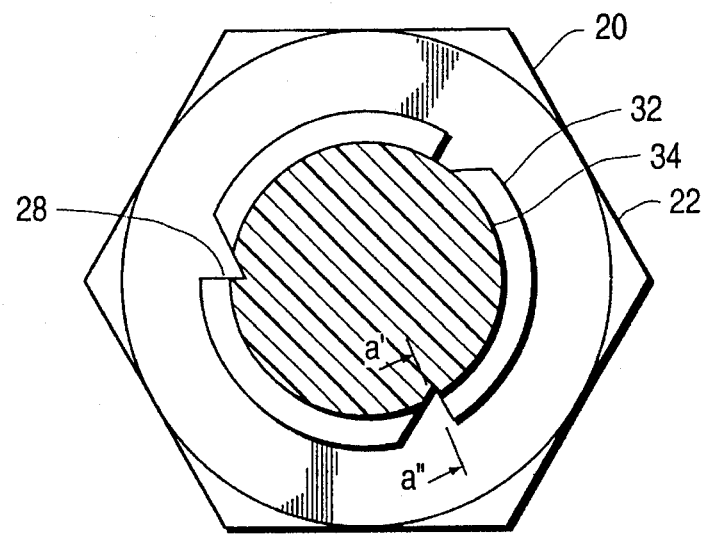
FIG. 2 illustrates a bottom cross-sectional view of the bolt of the present invention.
Figure 3:
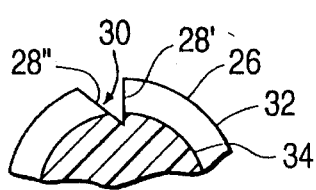
FIG. 3 illustrates a partial, cross-sectional view of the bolt from the perspective of section line a'-a" in FIG. 2.
Figure 4:
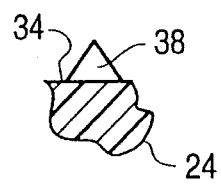
FIG. 4 depicts a partial, cross-sectional view of the bolt and particularly showing a notch on a bolt thread in accordance with the principles of the present invention.

Referring to FIGS. 2, 3 and 4, bolt 20 includes bolt head 22, stem 24, bolt thread 26, longitudinal channel 28, radially aligned channel surface 28', angularly displaced channel surface 28", notch 30 (defined by surfaces 28' and 28"), bolt crest 32, bolt trough 34, and triangular locking surface 38.

Referring particularly to FIGS. 1 and 2, bolt 20 has a bolt thread 26 thereon. Thread 26 is defined by a bolt crest 32 and a bolt trough 34. Longitudinal channel 28 extends through bolt thread 26 due to the longitudinal alignment of the notices in each bolt thread. Referring particularly to FIG. 2, radially aligned surface 28' and angularly displaced surface 28" converge to form a notch 30 at each thread crossing.

FIG. 1 illustrates a plurality of aligned notches 30 which define longitudinal channel 28.

Figure 5:
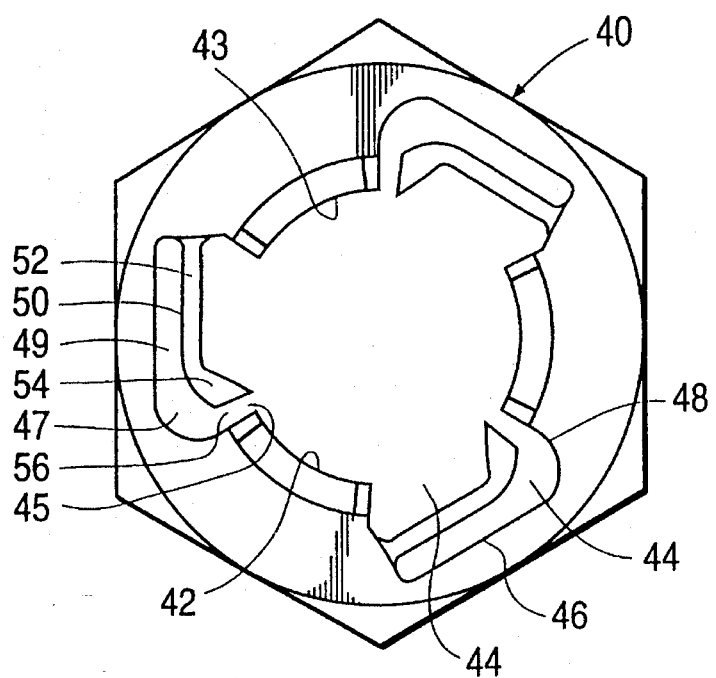
FIG. 5 depicts a top view of the nut of the present invention.
Figure 6:
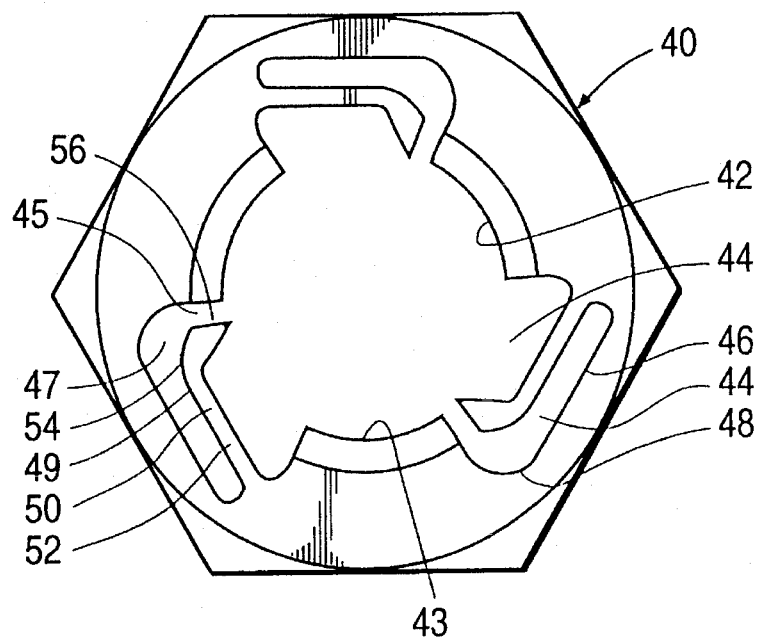
FIG. 6 shows a bottom view of the nut of the present invention.
Figure 6A:
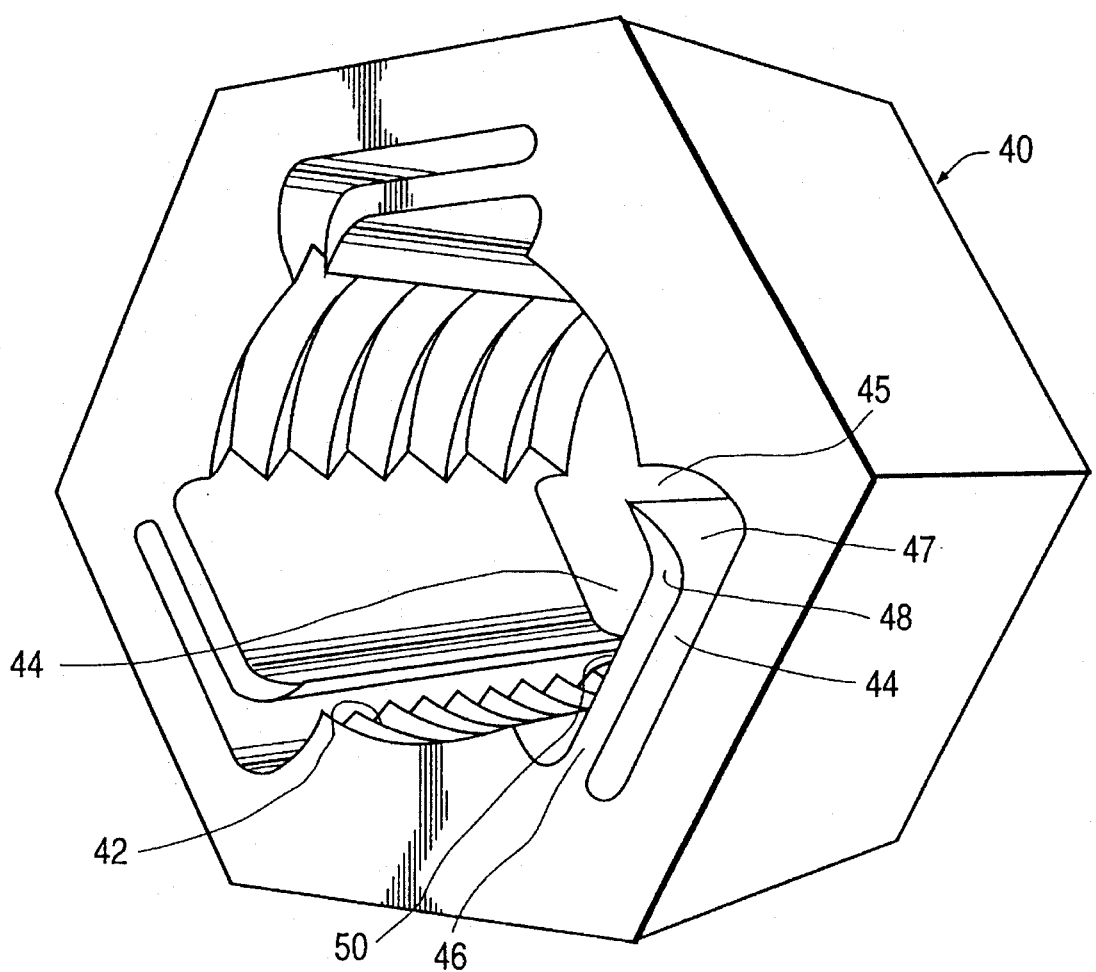
FIG. 6A illustrates a perspective view of the nut of the present invention.

FIGS. 5, 6 and 6A illustrate nut 40 having bore 42, nut thread 43, longitudinal cut-out 44, straight wall portion 46, arcuate wall portion 48, mouth opening 45, throat opening 47, and compressible tine 50 disposed in the cut-out. Compressible tine 50 includes backside surface 49, straight body proximal portion 52, arcuate distal portion 54 and distal end surface 56.

FIGS. 1, 6, 7 and 8 illustrate bolt thread 26 and nut thread 43 cooperatively permitting a user to rotate nut 40 one way one bolt thread 26, thereby permitting generally one way translational movement towards head 22 in FIG. 1. During the translation of nut 40 along bolt threads 26, tines 50 are alternately compressed inboard into cut-out 44 by contacting bolt threads 26, and then released to expand into the bolt channel when distal end 56, of tine 50, is disposed in longitudinal channel 28. Tine 50 and triangular locking surface 38, of longitudinal channel 28, thereby cooperatively prevent rotation of nut 40 in direction L.

Figure 7:
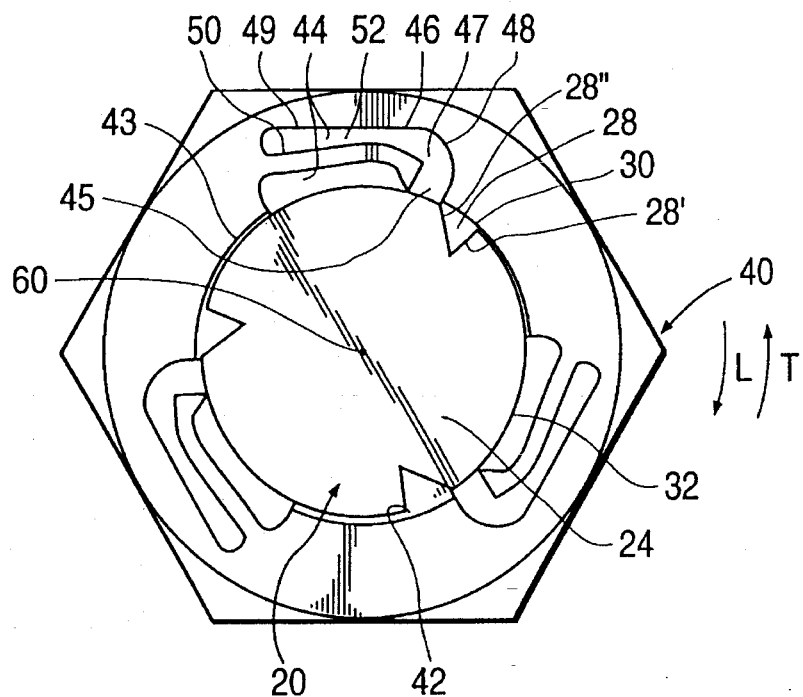
FIG. 7 depicts a bottom view of the present one-way nut and bolt combination when the tines are compressed inboard.

Referring particularly now to FIG. 7, it can be seen that a user desiring to translate nut 40 toward bolt head 22 may do so by rotating nut 40 in direction T. When tines 50 are compressed by bolt crest 32, due to contact between end 56 and crest 32, the tine 50 is flexed outboard, with respect to longitudinal central axis 60, best seen in FIGS. 1 and 7. When tine 50 flexes outboard, backside 49, of tine 50, is more closely disposed toward straight wall portion 46 and arcuate wall portion 48 of cut-out 44. As described above, tine 50 includes straight body proximal portion 52, arcuate distal portion 54, distal end 56 and backside 49. The straight body 52 and large open throat 47 permit multiple flexible movements of the tine in the cut-out.

Figure 8:
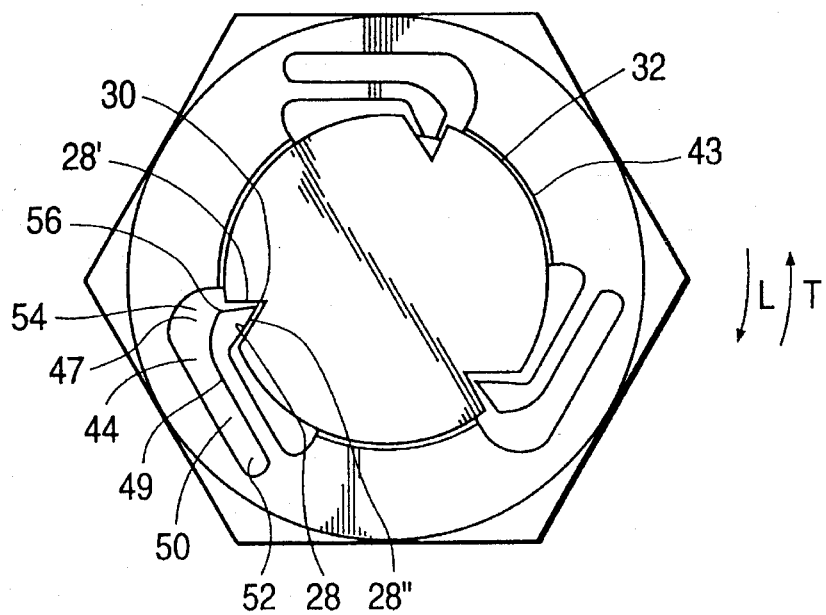
FIG. 8 shows the one-way nut and bolt combination when the tines are extended or in a locked position.

Referring now to FIG. 8, when nut 40 is rotated such that distal end 56 of tine 50 is disposed in longitudinal channel 28, counter-rotational movement, in direction L, cannot occur. End 56 abuts radial surface 28' and triangular locking surface 38 in FIG. 3. When nut 40 is rotated such that distal end 56, of tine 50, is received by notch 30, and correspondently disposed in longitudinal channel 28, tine 50 is released from compression. As described above, longitudinal channel 28 is defined by radially aligned surface 28' and angularly displaced surface 28". In FIGS. 3 and 8, triangular locking surface 38 of radially aligned surface 28' abuts distal end 56 and prevents further rotation of nut 40 in direction L when tine 50 is disposed in longitudinal channel 28. A user desiring to continue to rotate nut 40 in direction T may do so and tine 50 will again be compressed when distal end 56 contacts bolt crest 32.

Referring now to FIGS. 4, 7 and 8, mouth 45 is defined by distal end 56 and arcuate wall portion 48. Throat 47 is defined by backside 49 of tine 50 and the distal end segment of arcuate wall portion 48 of cut-out 44. In FIGS. 4, 7 and 8, mouth 45 is narrower than and leads to throat 47. When tine 50 is compressed by bolt crest 32, both mouth 45 and throat 47 narrow. However, mouth 45 continues to be wider than throat 47.

The one-way nut and bolt combination is made from injected or molded plastic. The tines and the cut-outs in the nut extended longitudinally on an inboard surface through the threaded nut bore. In the preferred embodiment, each cut-out extends longitudinally through the entire nut. Simalarly, a single tine extends throughout the longitudinal cut-out. Alternatively, multiple tines could be disposed, in an aligned manner, in each cut-out. The claims appended hereto are meant to cover this concept.

To remove the locked nut from the bolt, a tool having a single prong for each cut-out is inserted into the cut-out at a position radially inboard the body of the tine. This tool then compresses the tine (or tines if multiple, circumferentially spaced cut-out and tine configurations are utilized) and the compressed tine is radially moved outboard or away from the triangular locking surface at each bolt thread. The nut is moved or is translated away from the bolt head by substantially simultaneous counter-rotation of the nut, the outwardly disposed and compressed tine and the tool. In the illustrated embodiment, a three prong removal tool is utilized. The three prongs are joined together and circumferentially spaced apart the appropriate distance by a head plate or grid.

Another technique to remove the nut from the bolt involves the application of a high degree of reverse torque which causes the tine or tines to repeatedly "pop-out" of the notch over the triangular locking surface. Experimentally, the nut has been removed up to 10 times without significant deterioration.

One-way nut and bolt 10 can be made of a variety of materials. In the preferred embodiment, one-way nut and bolt 10 is cast from long glass fiber nylon. One-way nut and bolt 10 can be produced utilizing a number of casting methods. In the preferred embodiment, a multi-cavity single injection mold, requiring no additional manufacturing steps, is used to produce one-way nut and bolt 10.

The claims appended hereto are meant to cover modifications and changes within the spirit and scope of the present invention.

I claim:

1. A one way nut and bolt comprising:

a bolt having a bolt head and a bolt thread on a stem depending from said head, said bolt having a longitudinal channel extending through said threads and defined by a radially aligned surface and an angularly displaced surface converging to form a notch at each thread crossing, said longitudinal channel formed by a plurality of aligned notches, said threads defined by a crest and a trough;

a nut having a bore therethrough with an interior nut thread thereon that is complimentary to said bolt thread, said nut having a longitudinal interior cut-out therethrough, said cut-out defined by straight and arcuate wall portions;

a compressible tine extending into said cut-out, said tine having a straight body proximal portion, an arcuate distal portion and a distal end, said distal end of said tine and said arcuate portion of said cut-out defining a narrow mouth leading to a throat, said throat defined by a backside of said tine and an inwardly disposed segment of said arcuate wall of said cut-out, said throat being larger than said mouth;

whereby said nut thread and said bolt thread cooperatively permit translation of said nut along said bolt threads by one way rotation of said nut during which said tine is alternately compressed by contact with said crests and then released when disposed in said longitudinal channel, said longitudinal channel preventing counter-rotational movement of said nut when said tine is disposed in said longitudinal channel and said distal end of said tine abuts said radially aligned surface of said notch at each bolt thread crossing.

2. A one way nut and bolt as recited in claim 1, wherein said bolt further includes a longitudinal central axis and said straight body proximal portion of said tine is outwardly disposed from said crest of said bolt threads relative to said longitudinal central axis of said bolt.

3. A one way nut and bolt as recited in claim 2, wherein said radially aligned surface includes a locking triangular surface that cooperates with said distal end of said tine.

4. A one way nut and bolt as recited in claim 3, wherein said bolt thread has a predetermined thread depth and said longitudinal channel has a channel depth that exceeds said thread depth.

5. A one way nut and bolt as recited in claim 1, wherein said nut further comprises a plurality of tines circumferentially spaced around said nut bore.

6. A one way nut and bolt as recited in claim 5, wherein said plurality of tines are equally and circumferentially spaced around said nut bore.

7. A one way nut and bolt as recited in claim 6, wherein said bolt further comprises a plurality of longitudinal channels circumferentially spaced around said bolt stem.

8. A one way nut and bolt as recited in claim 7, wherein said plurality of longitudinal channels are equally and circumferentially spaced around said bolt stem.

9. A one way nut and bolt as recited in claim 8, wherein an end of said distal ends of said tines are longitudinally disposed in a plane parallel to the plane defined by said radially aligned surface.

10. A one way nut and bolt as recited in claim 9, wherein said cut-out extends through the longitudinal extent of said nut bore.

11. A one way nut and bolt as recited in claim 10, wherein said tine longitudinally extends through said longitudinally cut-out.

12. A one way nut and bolt as recited in claim 1, wherein said tine and notches form multiple locking surfaces throughout said nut bore.

13. A one way nut and bolt as recited in claim 12, wherein said multiple locking surfaces are triangularly shaped and formed by said longitudinal channel and said notch at said radially aligned surface.

14. A one way nut and bolt having a head, a stem and a bolt thread on said stem, said bolt having a longitudinal channel defined by a plurality of aligned notches, each notch defined by a radially aligned surface and an angularly displaced surface on each bolt thread;

a nut having a threaded bore that is complimentary to said bolt thread, said nut bore having at least one longitudinal cut-out;

a compressible tine extending into said cut-out having a body portion and substantially radially aligned distal end portion, said distal end portion of said tine defining a narrow mouth leading to a wider throat in said cut-out, said mouth opening to said nut bore;

whereby said nut thread and said bolt thread cooperatively permit translation of said nut along said bolt threads by one-way rotation, while said tine is alternately flexed inboard into said cut-out by said bolt threads and released when said tine is disposed in said longitudinal channel, said longitudinal channel and respective notches preventing counter-rotational movement of said nut and bolt when said end of said tine abuts said radially aligned surface of said notches.

15. A one way nut and bolt as recited in claim 14, wherein said throat is narrowed when said tine is flexed inboard into said cut-out.

* * * * *